US012506781B2

(12) United States Patent
Kumar et al.

(10) Patent No.: US 12,506,781 B2
(45) Date of Patent: Dec. 23, 2025

(54) GENERATING DECEPTIONS USING WEB ASSEMBLY BINARIES

(71) Applicant: International Business Machines Corporation, Armonk, NY (US)

(72) Inventors: Gautam Heera Kumar, Bangalore (IN); Mallikarjuna Mustugatti, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 18/606,309

(22) Filed: Mar. 15, 2024

(65) Prior Publication Data

US 2025/0294056 A1 Sep. 18, 2025

(51) Int. Cl.
H04L 9/40 (2022.01)

(52) U.S. Cl.
CPC .................. *H04L 63/1491* (2013.01)

(58) Field of Classification Search
CPC ................................. H04L 63/1491
See application file for complete search history.

(56) References Cited

U.S. PATENT DOCUMENTS

| | | | |
|---|---|---|---|
| 9,716,727 B1 * | 7/2017 | Seger | H04L 63/1491 |
| 9,853,999 B2 | 12/2017 | Singh et al. | |
| 10,333,976 B1 | 6/2019 | Yudovich et al. | |
| 10,382,483 B1 | 8/2019 | Kafri et al. | |
| 10,498,763 B2 | 12/2019 | Araujo et al. | |
| 11,233,823 B1 * | 1/2022 | Venkataramani | H04L 63/1491 |
| 12,041,094 B2 * | 7/2024 | Sharifi Mehr | H04L 63/145 |
| 2021/0067553 A1 * | 3/2021 | Ries | H04L 63/0263 |
| 2023/0106071 A1 * | 4/2023 | Kleymenov | H04L 63/1491 726/23 |
| 2023/0231882 A1 * | 7/2023 | Deng | H04L 63/1416 726/23 |

FOREIGN PATENT DOCUMENTS

CN 116232723 A * 6/2023 ......... H04L 63/1491

OTHER PUBLICATIONS

English language translation of Chinese Patent CN116232723A (9 pages) (Year: 2023).*
FortiDeceptor, "FortiDeceptor: Deception-based Breach Protection Overview," Fortinet SecOps Platform, Fortinet, accessed Feb. 27, 2024, https://www.fortinet.com/products/fortideceptor.
Github, "deception," GitHub Topics, 7 pages, GitHub, accessed Feb. 29, 2024, https://github.com/topics/deception.

(Continued)

*Primary Examiner* — Thomas A Gyorfi
(74) *Attorney, Agent, or Firm* — Yee & Associates, P.C.

(57) ABSTRACT

Deception management is provided. Configuration of a plurality of assets in an information technology (IT) environment of an entity is detected based on a scan of the plurality of assets. A plurality of deceptions is generated by customizing predefined deceptions based on specific needs of the entity corresponding to a geographic location of the IT environment. The plurality of deceptions are deployed among the plurality of assets within the IT environment based on the configuration of the plurality of assets in the IT environment.

20 Claims, 6 Drawing Sheets

(56) References Cited

OTHER PUBLICATIONS

He, "Optimal Deception Asset Deployment in Cybersecurity: A Nash Q-Learning Approach in Multi-Agent Stochastic Games," Applied Sciences, Dec. 30, 2023, 29 pages, vol. 14, MDPI, accessed Feb. 27, 2024, https://www.mdpi.com/2076-3417/14/1/357.

Niakanlahiji, et al., "HoneyBug: Personalized Cyber Deception for Web Applications," Proceedings of the 53rd Hawaii International Conference on System Sciences, Jan. 10, 2020, 11 pages, ResearchGate, accessed Feb. 27, 2024, https://www.researchgate.net/publication/338501968.

Shahid, et al., "A deep learning assisted personalized deception system for countering web application attacks," Journal of Information Security and Applications, vol. 67, Jun. 2022, 17 pages, https://www.sciencedirect.com/science/article/abs/pii/S2214212622000540?via%3Dihub.

* cited by examiner

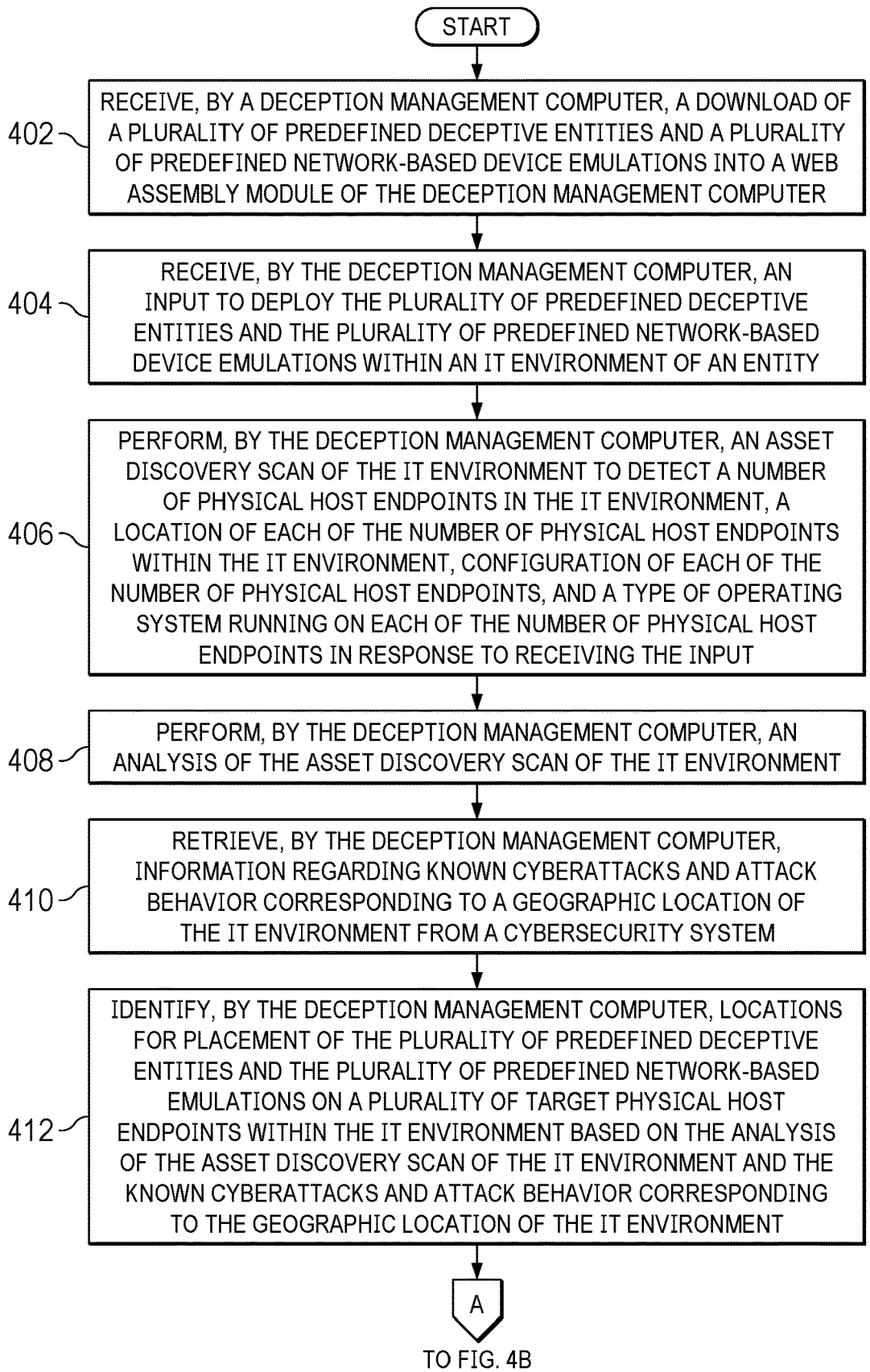

GENERATING DECEPTIONS USING WEB ASSEMBLY BINARIES

BACKGROUND

The disclosure relates generally to deception technology and more specifically to deception management.

Deception technology generates deceptions that appear realistic, but in actuality are fake assets (i.e., assets that do not physically exist), and deploys the deceptions in an information technology (IT) environment, infrastructure, platform, or the like, alongside real assets. In other words, deception technology is a strategy to attract unauthorized users away from the real assets of an entity, such as, for example, an enterprise, business, company, organization, institution, agency, or the like, and divert the unauthorized users to a deception. The deception mimics a real asset such that the unauthorized user is tricked into believing that the unauthorized user has infiltrated and gained access to an entity's real asset when in reality the unauthorized user has not. Thus, an unauthorized user who breaches an IT environment of an entity has no way of differentiating fake assets from real assets.

SUMMARY

According to one illustrative embodiment, a computer-implemented method for deception management is provided. A computer detects configuration of a plurality of assets in an information technology (IT) environment of an entity based on a scan of the plurality of assets. The computer generates a plurality of deceptions by customizing predefined deceptions based on specific needs of the entity corresponding to a geographic location of the IT environment. The computer deploys the plurality of deceptions among the plurality of assets within the IT environment based on the configuration of the plurality of assets in the IT environment. According to other illustrative embodiments, a computer system and computer program product for deception management are provided.

BRIEF DESCRIPTION OF THE DRAWINGS

FIGS. 4A-4B are a flowchart illustrating a process for deception management in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
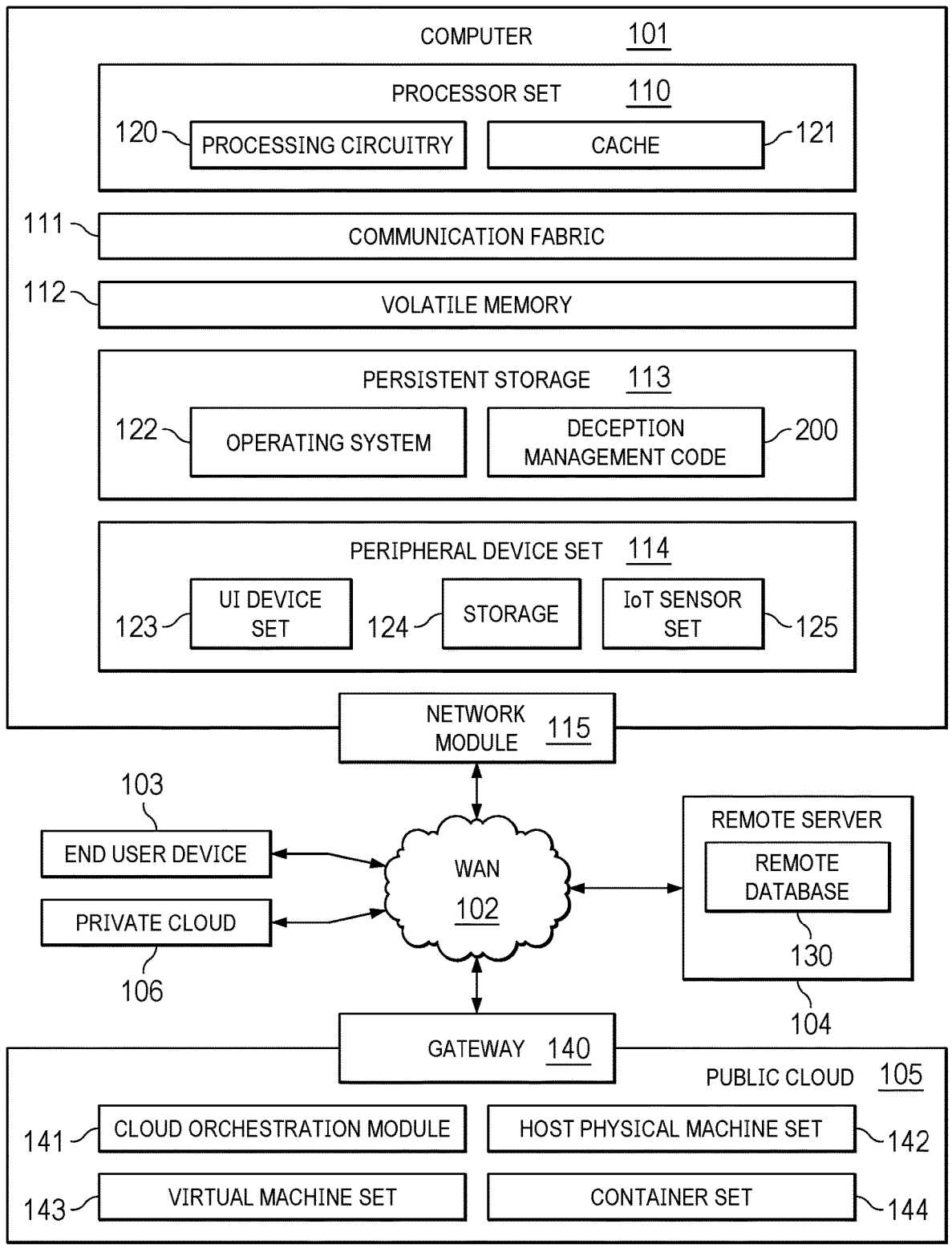
FIG. 1 is a pictorial representation of a computing environment in which illustrative embodiments may be implemented.
Figure 2:
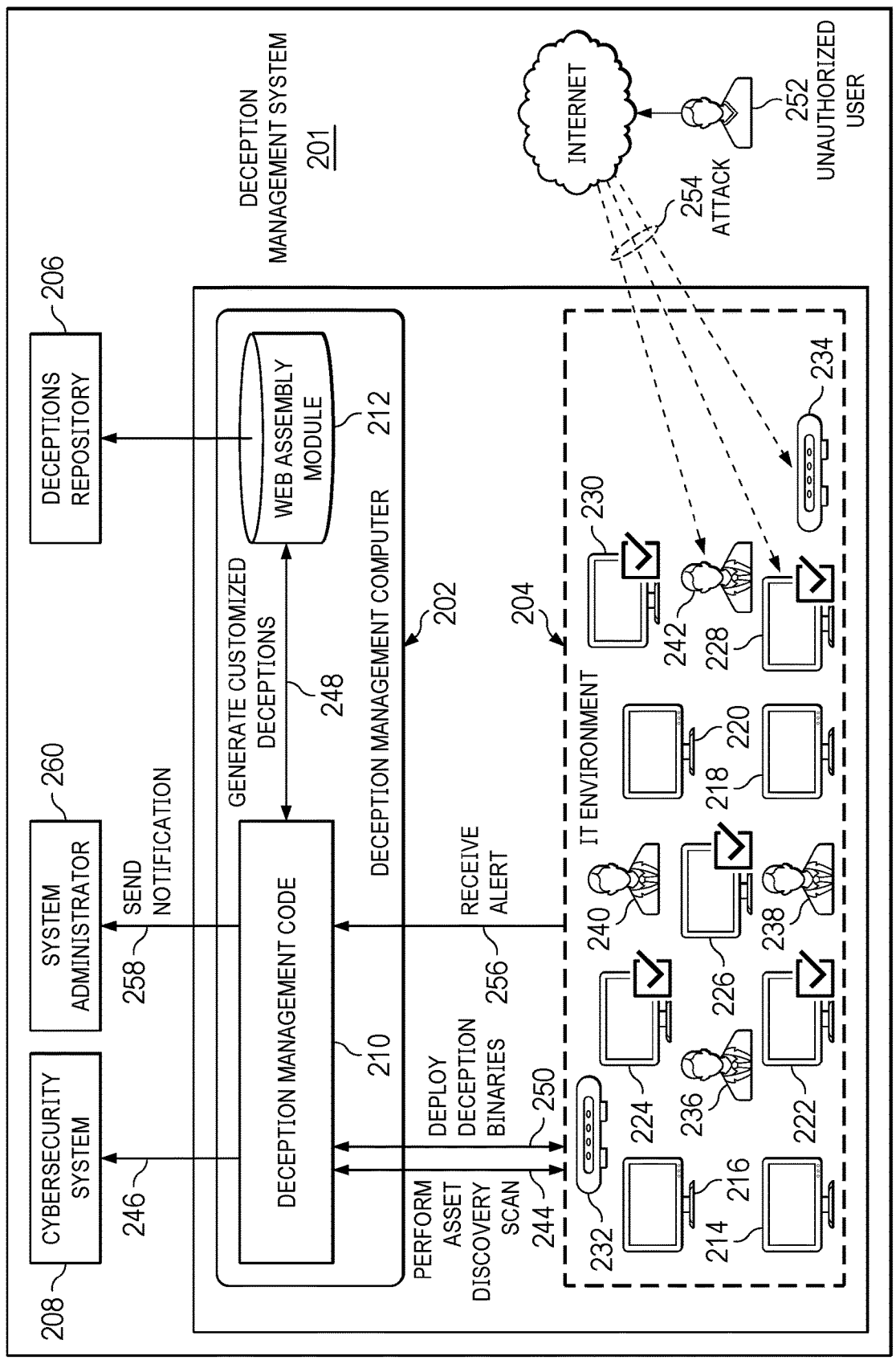
FIG. 2 is a diagram illustrating an example of a deception management system in accordance with an illustrative embodiment.
Figure 3:
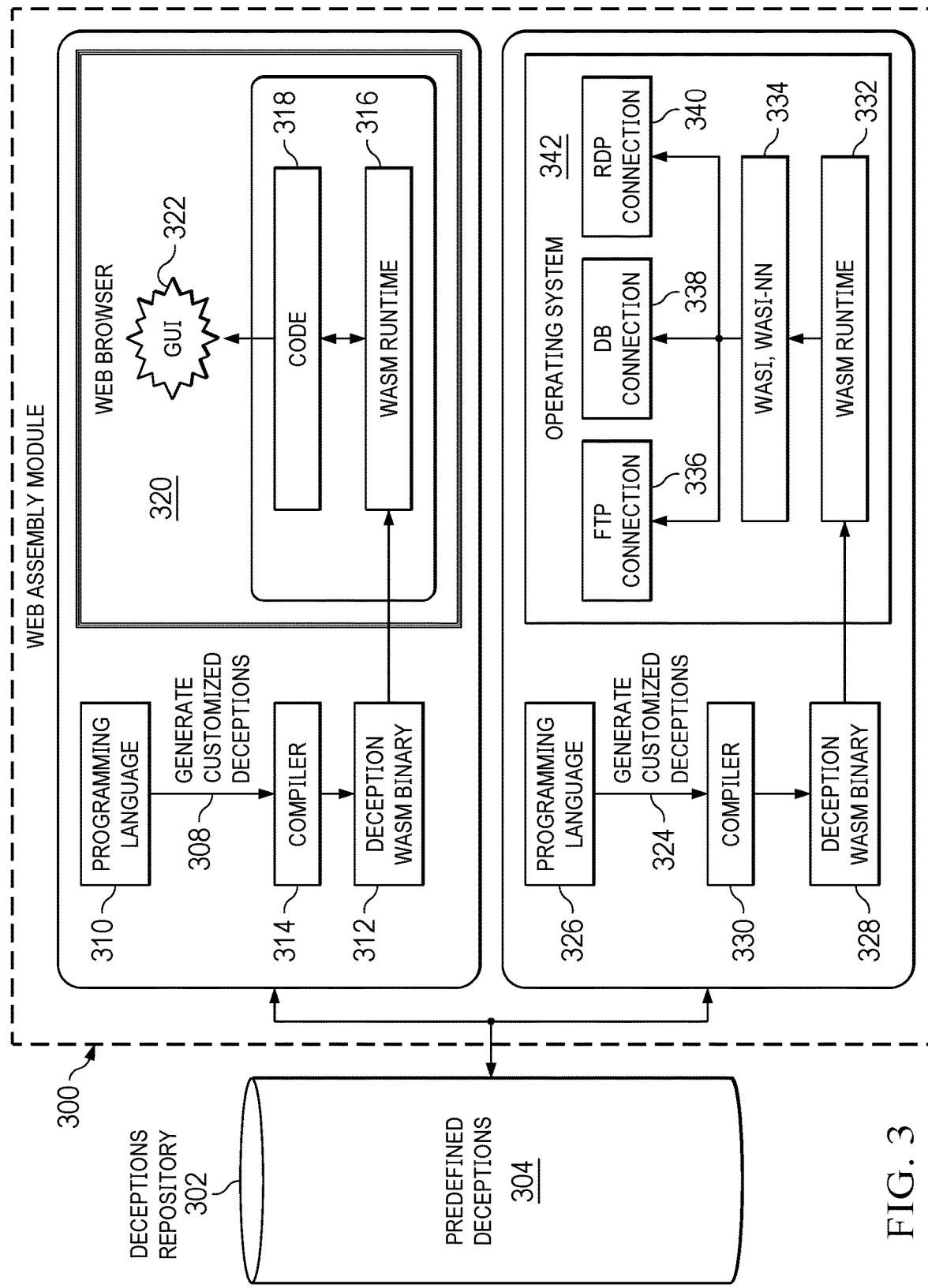
FIG. 3 is a diagram illustrating an example of a Web Assembly module in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as deception management code 200.

For example, deception management code 200 customizes deceptions based on factors such as specific needs of an entity corresponding to geographic location. The customized deceptions can be, for example, deceptive entities such as remote desktop protocol connections, database connections, file transfer protocol connections, and the like, along with emulations of network-based devices such as switches, routers, internet protocol (IP) cameras, network printers, and the like. Deception management code 200 deploys the customized deceptions among real assets within an information technology (IT) environment of an entity and collects asset information using an agent-less approach. Deception management code 200 provides a realistic layout within the IT environment with customized deceptions deployed without using intermediary trap servers.

Deception management code 200 deploys the customized deceptions within operating systems of real assets, as well as web browsers. Unlike most current deception technology solutions, deception management code 200 does not utilize honeypots, which are not scalable and increase deployment and maintenance costs because each honeypot needs an individual virtual machine. Deception management code 200 utilizes Web Assembly technology to generate the customized deceptions (i.e., deception Web Assembly binaries), which are portable into multiple types of operating systems and web browsers. Web Assembly provides an instruction format for executable programs (e.g., operating systems, web browsers, and the like), as well as software interfaces (e.g., graphical user interfaces and the like) for facilitating interactions between the executable programs and the host environment. Web Assembly is an open standard that supports most programming languages (e.g., C, C++, Ruby, Rust, and the like) on any operating system. In other words, Web Assembly is designed as a portable compilation target for programming languages, enabling deployment on the web for clients and servers. Web Assembly executes at native speed by taking advantage of common hardware capabilities available on a wide range of platforms.

Unauthorized users (e.g., attackers, hackers, malicious users, and the like) are becoming more sophisticated and sandboxing does not work anymore. As a result, deception management code 200 utilizes an agent-less approach, which is more efficient and scalable than current deception technology solutions, to deploy customized deceptions on endpoints (e.g., physical hosts) within the IT environment. In other words, deception management code 200 does not utilize any agents on endpoints within the IT environment. Because deception management code 200 generates deception binaries using Web Assembly, the deception binaries are compatible with all types of operating systems and web browsers. It should be noted that deception management code 200 utilizes Web Assembly to generate the deception binaries instead of containers because containers share the same host operating system, which allows any vulnerabilities in the host system to be exploited by an unauthorized user to gain access to all containers running on that host system.

In addition to deception management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and deception management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in deception management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the deception management services provided by computer 101), and may take any of the forms discussed above in connection with computer 101. EUD 103 typically receives helpful and useful data from the operations of computer 101. For example, in a hypothetical case where computer 101 is designed to provide a deception deployment recommendation to the end user, this recommendation would typically be communicated from network module 115 of computer 101 through WAN 102 to EUD 103. In this way, EUD 103 can display, or otherwise present, the deception deployment recommendation to the end user. In some embodiments, EUD 103 may be a client device, such as thin client, heavy client, mainframe computer, desktop computer, laptop computer, tablet computer, smart phone, smart glasses, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a deception deployment recommendation based on historical deception deployment data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Deception technology automates the generation of deceptions and the integration of the deceptions among real assets within an existing IT environment, infrastructure, network, or the like. These deceptions provide asset protection by detecting unauthorized users who have accessed the IT environment. Deceptions can be IT assets that utilize licensed operating system software or emulate various network-based devices, such as, for example, automated teller machines (ATMs), retail point-of-sale systems, switches, routers, medical devices, printers, internet protocol (IP) cameras, and the like. Deceptions can also include fake data resources, such as, for example, fake data files of different types, fake user credentials, and the like that are stored on host endpoints.

When a user (e.g., an unauthorized user or an authorized user) accesses a deception, the deception sends an alert to a deception management computer (e.g., server) to start collecting information regarding the user's actions and intent. The deception management computer is capable of detecting, in real time, most cyberattacks including, for example, reconnaissance attacks, zero-day attacks, lateral movement attacks, malware attacks, social engineering attacks, man-in-the-middle attacks, ransomware attacks, and the like. Deception technology enables a proactive security posture that seeks to deceive an unauthorized user, detect the presence of the unauthorized user, and then perform steps to mitigate the unauthorized access.

Deception technology tokens and traps are effective in leading attackers away from real assets and stopping an attack before the attack can be executed. However, current deception technology solutions utilize a deceptive host to relay information back to a trap server hosted on an additional virtual machine. Each virtual machine can enable up to 8 IP addresses and each IP address can support 3 deceptive hosts. If an attacker performs a reconnaissance attack on the IT environment, the result of the reconnaissance attack may show multiple hosts having the same IP address, which is unusual and may cause the attacker to become suspicious of deceptive hosts being placed within the network.

One issue with current deception technology solutions is that the setup provided by existing deception technology vendors does not provide an effective illusion or deception to the attacker (e.g., during a reconnaissance, the unauthorized user will become suspicious of the same IP address appearing on multiple hosts). Another issue corresponding to current deception technology solutions is that existing deception technology vendors utilize containers to generate the deceptions. However, the containers share the same host operating system, which means that any vulnerabilities in the host system can be exploited by an unauthorized user to gain access to all containers running on that host system. A further issue corresponding to current deception technology solutions is that these current deception technology solutions only provide 5-7 types of network devices to select from and these 5-7 types of network devices are not customizable at all.

Because current deception technology solutions utilize multiple supporting trap servers, the overhead and maintenance costs are increased. Further, configurations of running deceptive traps remain in their default settings when the deception technology platform is not updated. Furthermore, the trap servers have too many ports open, which is a giveaway to a seasoned attacker.

Illustrative embodiments generate and distribute a plurality of customized deceptions (e.g., deceptive entities and network-based emulations) within an IT environment of an entity for an effective deception to unauthorized users, eliminating the need for intermediary trap servers. Because these deployed deceptions on target endpoints within an IT environment do not point back to any host (e.g., trap server or the like), illustrative embodiments are able to create an effective deception to unauthorized users by blending these deceptions into the IT environment. Thus, illustrative embodiments are capable of providing realistic layouts within IT environments with customized deceptions deployed. In addition, as illustrative embodiments eliminate the need for trap servers within the IT environment, the assignment of deceptions is much faster decreasing resource utilization and cost.

Because illustrative embodiments do not assign IP addresses to the deceptions, unauthorized users find it difficult to identify the deceptions within the IT environment. Also, because illustrative embodiments generate the deception binaries using Web Assembly, the deception binaries are compatible with most operating systems and web browsers.

A system administrator deploys a deception management computer, which includes a Web Assembly module, within an IT environment of an entity. Alternatively, the deception management computer can be located remotely from the IT environment of the entity, providing deception management services to a plurality of different IT environments corresponding to different entities. The system administrator also downloads a plurality of predefined deceptions (e.g., predefined deceptive entities and predefined network-based device emulations) from a deceptions repository to the Web Assembly module. The deception management computer deploys deceptions within the IT environment based on, for example, specific needs of the entity corresponding to the geographic location of the IT environment. For example, the deception management computer may deploy deceptions within the IT environment based on retrieved information from a cybersecurity system regarding known cyberattacks and attack behavior corresponding to the geographic location of the IT environment. Alternatively, the deception management computer may deploy deceptions within the IT environment based on input from, for example, the system administrator or a threat management team of the entity.

In response to the deception management computer of illustrative embodiments receiving an input to deploy the plurality of predefined deceptions within the IT environment of the entity, the deception management computer performs an asset discovery scan of the IT environment to detect, for example, number of physical hosts in the IT environment, type of operating systems running on the physical hosts, and the like. Afterward, the deception management computer performs an analysis of the asset discovery scan of the IT environment.

The deception management computer identifies locations for placement of the plurality of predefined deceptions on target physical host endpoints within the IT environment based on the analysis of the asset discovery scan of the IT environment and the specific needs of the entity corresponding to the geographic location of the IT environment. In addition, deception management computer customizes the plurality of predefined deceptions by generating a deception Web Assembly binary for each respective deception of the plurality of predefined deceptions using a Web Assembly module to form a plurality of customized deceptions. The Web Assembly binaries are executable files, for example. The plurality of customized deceptions include, for example, remote desktop protocol connections, database connections, file transfer protocol connections, server message block protocol connections to share files, secure shell protocol connections, Telnet protocol connections, scripts and emulations of network-based devices such as network printers, IP cameras, routers, switches, and the like. The deception management computer deploys the plurality of customized deceptions on the target physical host endpoints within the IT environment based on the specific needs of the entity using the deception Web Assembly binary of each respective deception the plurality of customized deceptions. It should be noted that not every endpoint within the IT environment will include a customized deception.

Subsequently, an unauthorized user performs a reconnaissance of the IT environment of the entity gathering information to prepare for an attack. In response to receiving an indication that a reconnaissance is being performed on the IT environment, the deception management computer records the activity corresponding to the reconnaissance. The reconnaissance activity may include, for example, probing deceptive users for access credentials. A deceptive user is a fake user who has fake access credentials and no access permissions or roles corresponding to the entity.

Afterward, the unauthorized user launches the attack on a physical host endpoint having at least one of a customized deceptive entity (e.g., remote desktop protocol connection, database connection, file transfer protocol connection, or the like) and a customized network-based device emulation (e.g., network printer, IP camera, router, or the like) deployed on that particular physical host endpoint within the IT environment using the fake access credentials of the deceptive user that the unauthorized user obtained during the reconnaissance of the IT environment. In response to receiving an alert regarding access by the unauthorized user to the customized deceptive entity or the customized network-based device emulation deployed on the physical host endpoint, the deception management computer sends a notification to the system administrator regarding the unauthorized access. Further, the deception management computer performs a set of action steps to mitigate the effects of the unauthorized access by, for example, automatically terminating the connection of the unauthorized user to the IT environment, automatically removing any files, scripts, code, or the like received during the unauthorized access, sending a notification to the cybersecurity system regarding the unauthorized access, recording any information corresponding to the unauthorized access to prevent similar future attacks, and the like.

Thus, illustrative embodiments provide one or more technical solutions that overcome a technical problem with an inability of current deception technology solutions to generate and deploy customized deceptions using Web Assembly technology. As a result, these one or more technical solutions provide a technical effect and practical application in the field of deception technology.

With reference now to FIG. 2, a diagram illustrating an example of a deception management system is depicted in accordance with an illustrative embodiment. Deception management system 201 may be implemented in a computing environment, such as computing environment 100 in FIG. 1. Deception management system 201 is a system of hardware and software components for generating and deploying customized deceptions using Web Assembly technology.

In this example, deception management system 201 includes deception management computer 202, IT environment 204, deceptions repository 206, and cybersecurity system 208. However, it should be noted that deception management system 201 is intended as an example only and not as a limitation on illustrative embodiments. For example, deception management system 201 can include any number of deception management computers, IT environments, deceptions repositories, cybersecurity systems, and other devices and components not shown.

Deception management computer 202 may be, for example, computer 101 in FIG. 1. Deception management computer 202 controls the process of generating and deploying customized deceptions using Web Assembly technology. For example, deception management computer 202 includes deception management code 210, such as deception management code 200 in FIG. 1.

IT environment 204 can represent any type of IT environment (e.g., a network of computers and other electronic devices such as printers, routers, switches, phones, storage devices, and the like) owned, operated, or managed by an entity, such as, an enterprise, business, company, organization, institution, agency, or the like. Deceptions repository 206 represents a database containing a plurality of predefined or default deceptions, such as deceptive entities, network-based device emulations, and the like. System administrator 260 downloads the plurality of predefined deceptions from deceptions repository 206 into Web Assembly module 212, which is a component of deceptions management computer 202.

Cybersecurity system 208 represents a security platform that is capable of recognizing and addressing security threats and vulnerabilities before the security threats and vulnerabilities have a chance to disrupt operations of an entity. Cybersecurity system 208 is capable of detecting user behavior anomalies and utilizes artificial intelligence to automate threat detection and mitigation. Cybersecurity system 208 contains a registry of known cyberattacks and their attack behaviors according to different geographic locations.

In this example, IT environment 204 includes real asset 214, real asset 216, real asset 218, real asset 220, physical host with deceptive entity 222, physical host with deceptive entity 224, physical host with deceptive entity 226, physical host with deceptive entity 228, physical host with deceptive entity 230, network-based device emulation 232, network-based device emulation 234, deceptive user 236, deceptive user 238, deceptive user 240, and deceptive user 242. However, it should be noted that IT environment 204 is intended as an example only and not as a limitation on illustrative embodiments. For example, IT environment 204 can include any number of real assets, physical hosts with deceptive entities, network-based device emulations, deceptive users, and the like.

At 244, deception management computer 202 performs an asset discovery scan of IT environment 204 in response to receiving an input from system administrator 260 to deploy deceptions in IT environment 204. In addition, at 246, deception management computer 202 retrieves known cyberattacks and their related attack behaviors corresponding to the geographic location of IT environment 204. Afterward, deception management computer 202 identifies target physical endpoints for deploying the deceptions within IT environment 204 based on the asset discovery scan and the known cyberattacks and their attack behaviors corresponding to the geographic location of IT environment 204.

At 248, deception management computer 202 generates customized deceptions from the plurality of predefined deceptions utilizing Web Assembly module 212. At 250, deception management computer 202 deploys the deception Web Assembly binaries of the customized deceptions on the identified target physical endpoints, as physical host with deceptive entity 222, physical host with deceptive entity 224, physical host with deceptive entity 226, physical host with deceptive entity 228, physical host with deceptive entity 230, network-based device emulation 232, network-based device emulation 234, deceptive user 236, deceptive user 238, deceptive user 240, and deceptive user 242, within IT environment 204.

At some point in time, unauthorized user 252 performs attack 254 on IT environment 204. In this example, unauthorized user 252 accesses physical host with deceptive entity 228 and network-based device emulation 234 using fake credentials corresponding to deceptive user 242. At 256, in response to the access, deceptive management computer 202 receives an alert from at least one of physical host with deceptive entity 228 and network-based device emulation 234 regarding the access.

At 258, in response to receiving the alert, deception management computer 202 sends a notification to system administrator 260 regarding the access. Further, deception management computer 202 automatically performs a set of action steps to mitigate the access by unauthorized user 252. Furthermore, deception management computer 202 records any activities performed by unauthorized user 252 during attack 254 and forwards that activity information corresponding to attack 254 to cybersecurity system 208 for future reference.

With reference now to FIG. 3, a diagram illustrating an example of a Web Assembly module is depicted in accordance with an illustrative embodiment. Web Assembly module 300 is implemented in a computer, such as, for example, deception management computer 202 in FIG. 2. Web Assembly module 300 can be, for example, Web Assembly module 212 in FIG. 2.

In this example, Web Assembly module 300 accesses deceptions repository 302 to retrieve predefined deceptions 304. Predefined deceptions 304 can include, for example, deceptive entities, emulations of network-based devices, and the like.

At 308, Web Assembly module 300 generates customized deceptions for web browser 320 using a set of predefined deceptions 304 retrieved from deception repository 302. Alternatively, a system administrator, such as, for example, system administrator 260 in FIG. 2, can create customized deceptions for web browser 320 using programming language 310, such as, for example, C, C++, Ruby, Rust, or the like.

Afterward, Web Assembly module 300 generates deception Web Assembly (WASM) binary 312 utilizing compiler 314 for each respective customized deception generated for web browser 320. Web Assembly runtime 316 uses deception Web Assembly binary 312 to communicate directly with code 318 (e.g., JavaScript) in web browser 320. Code 318 generates graphical user interface (GUI) 322 for web browser 320, which was programmed previously. GUI 322 permits access to a variety of medium-interaction deceptions, such as, for example, an IP camera, network printer, router, or the like, that an unauthorized user, such as, for example, unauthorized user 252 in FIG. 2, can interact with directly triggering a security alert.

Also in this example, at 324, Web Assembly module 300 generates customized deceptions for operating system 342 using a different set of predefined deceptions 304 retrieved from deceptions repository 302. Alternatively, the system administrator can create customized deceptions for operating system 342 using programming language 326. Afterward, Web Assembly module 300 generates deception Web Assembly binary 328 utilizing compiler 330 for each respective customized deception for operating system 342. Web Assembly runtime 332 uses Web Assembly System Interface (WASI) or WASI-NN (Neural Network) 334 to deploy deception Web Assembly binary 328 for each respective customized deception in operating system 342. Deployment of deception Web Assembly binary 328 for each respective customized deception in operating system 342 enables operating system 342 to generate a variety of low-interaction deceptions, such as FTP connection 336, DB connection 338, and RDP connection 340, which the unauthorized user cannot communicate or interact with directly but will trigger a security alert.

Figure 4B:
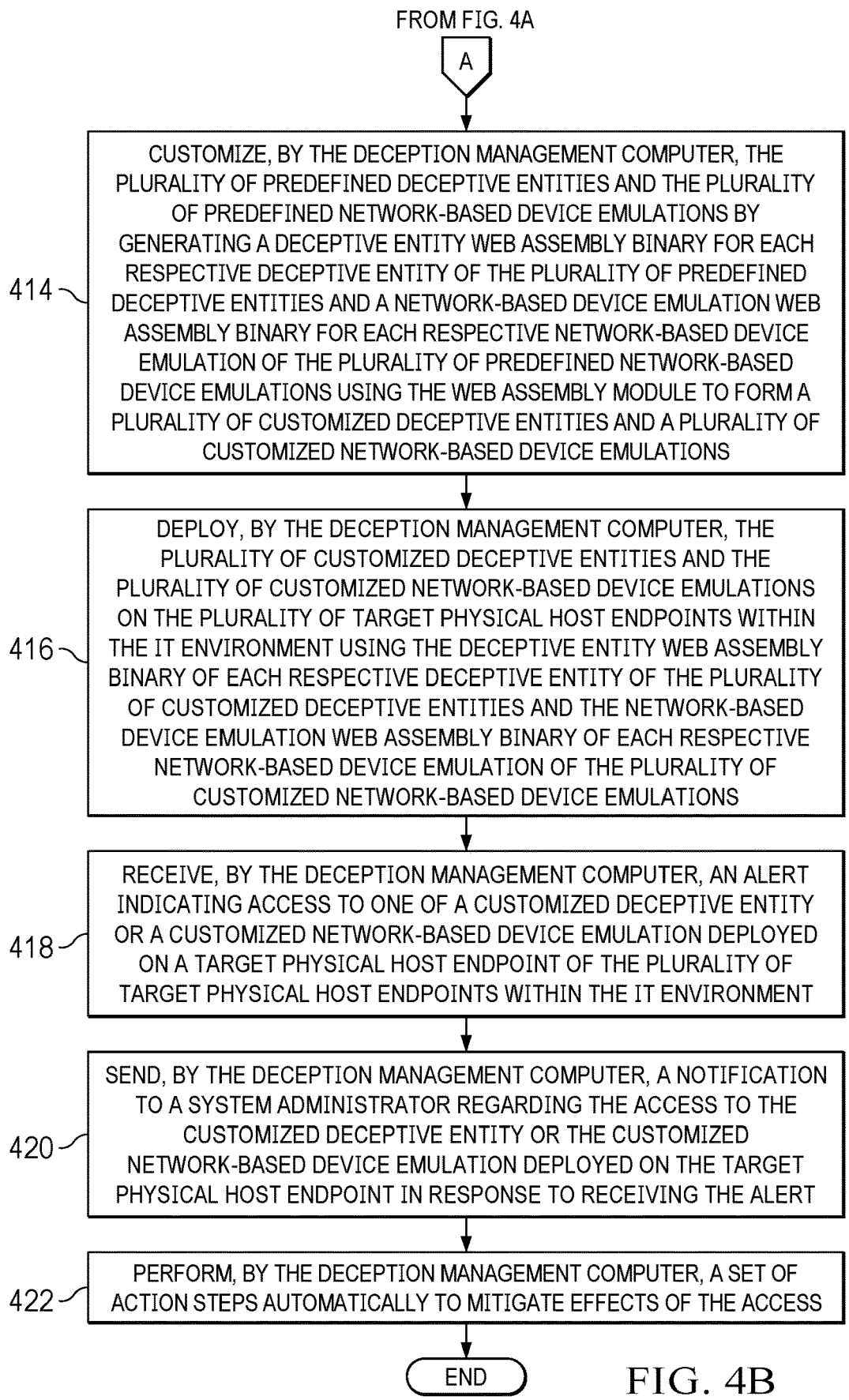

With reference now to FIGS. 4A-4B, a flowchart illustrating a process for deception management is shown in accordance with an illustrative embodiment. The process shown in FIGS. 4A-4B may be implemented in a computer, such as, for example, computer 101 in FIG. 1 or deception management computer 202 in FIG. 2. For example, the process shown in FIGS. 4A-4B may be implemented by deception management code 200 in FIG. 1 or deception management code 210 in FIG. 2.

The process begins when the deception management computer receives a download of a plurality of predefined deceptive entities and a plurality of predefined network-based device emulations into a Web Assembly module of the deception management computer (step 402). Afterward, the deception management computer receives an input to deploy the plurality of predefined deceptive entities and the plurality of predefined network-based device emulations within an IT environment of an entity (step 404).

In response to receiving the input, the deception management computer performs an asset discovery scan of the IT environment to detect a number of physical host endpoints in the IT environment, a location of each of the number of physical host endpoints within the IT environment, configuration of each of the number of physical host endpoints, and a type of operating system running on each of the number of physical host endpoints (step 406). The deception management computer performs an analysis of the asset discovery scan of the IT environment (step 408).

In addition, the deception management computer retrieves information regarding known cyberattacks and attack behavior corresponding to a geographic location of the IT environment from a cybersecurity system (step 410). The deception management computer identifies locations for placement of the plurality of predefined deceptive entities and the plurality of predefined network-based emulations on a plurality of target physical host endpoints within the IT environment based on the analysis of the asset discovery scan of the IT environment and the known cyberattacks and attack behavior corresponding to the geographic location of the IT environment (step 412).

The deception management computer customizes the plurality of predefined deceptive entities and the plurality of predefined network-based device emulations by generating a deceptive entity Web Assembly binary for each respective deceptive entity of the plurality of predefined deceptive entities and a network-based device emulation Web Assembly binary for each respective network-based device emulation of the plurality of predefined network-based device emulations using the Web Assembly module to form a plurality of customized deceptive entities and a plurality of customized network-based device emulations (step 414). The deception management computer deploys the plurality of customized deceptive entities and the plurality of customized network-based device emulations on the plurality of target physical host endpoints within the IT environment using the deceptive entity Web Assembly binary of each respective deceptive entity of the plurality of customized deceptive entities and the network-based device emulation Web Assembly binary of each respective network-based device emulation of the plurality of customized network-based device emulations (step 416).

Subsequently, the deception management computer receives an alert indicating access to one of a customized deceptive entity or a customized network-based device emulation deployed on a target physical host endpoint of the plurality of target physical host endpoints within the IT environment (step 418). In response to receiving the alert, the deception management computer sends a notification to a system administrator regarding the access to the customized deceptive entity or the customized network-based device emulation deployed on the target physical host endpoint (step 420). Moreover, the deception management computer performs a set of action steps automatically to mitigate effects of the access (step 422). The set of action steps includes, for example, automatically terminating the connection to the IT environment corresponding to the unauthorized access, automatically removing any files, scripts, code, or the like received during the unauthorized access, sending a notification to the cybersecurity system regarding the unauthorized access, recording any information corresponding to the unauthorized access to prevent similar future unauthorized access, and the like. Thereafter, the process terminates.

Figure 5:
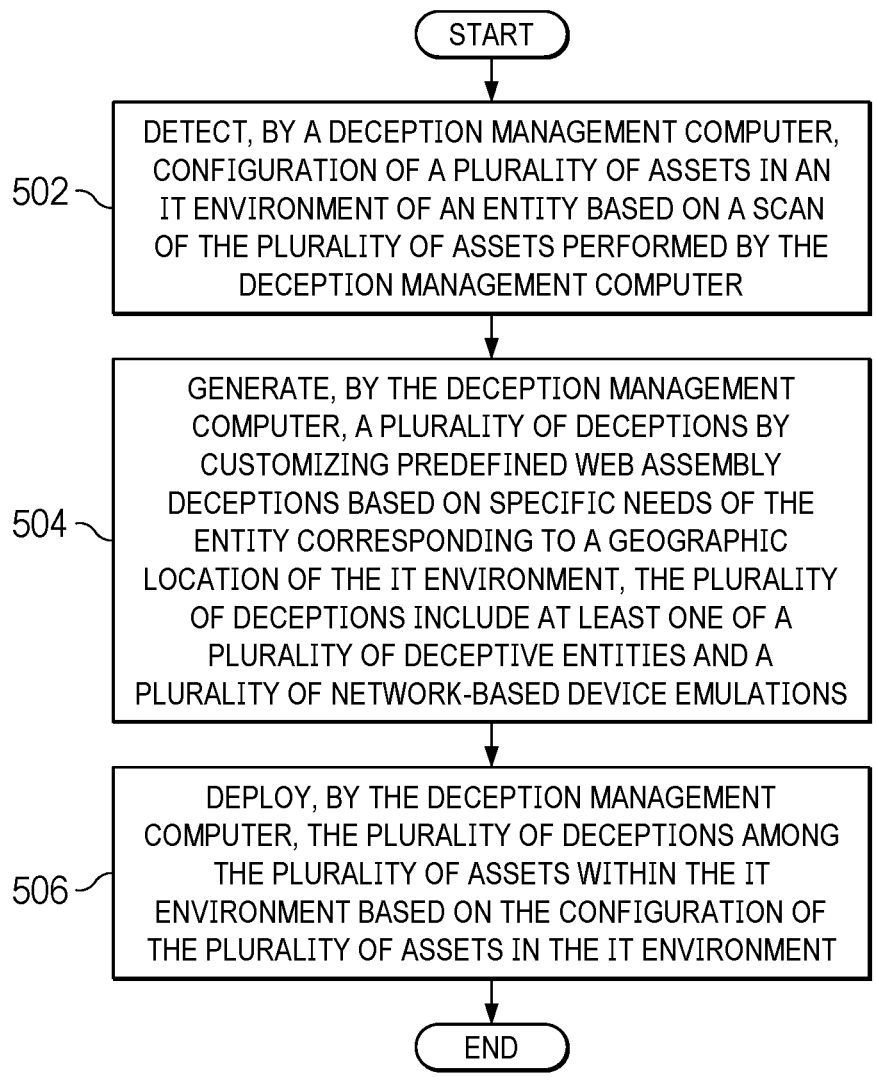
FIG. 5 is a flowchart illustrating a process for deploying deceptions in accordance with an illustrative embodiment.

With reference now to FIG. 5, a flowchart illustrating a process for deploying deceptions is shown in accordance with an illustrative embodiment. The process shown in FIG. 5 may be implemented in a computer, such as, for example, computer 101 in FIG. 1 or deception management computer 202 in FIG. 2. For example, the process shown in FIG. 5 may be implemented by deception management code 200 in FIG. 1 or deception management code 210 in FIG. 2.

The process begins when the deception management computer detects configuration of a plurality of assets in an IT environment of an entity based on a scan of the plurality of assets performed by the deception management computer (step 502). The deception management computer generates a plurality of deceptions by customizing predefined Web Assembly deceptions based on specific needs of the entity corresponding to a geographic location of the IT environment (step 504). The plurality of deceptions include at least one of a plurality of deceptive entities and a plurality of network-based device emulations. The deception management computer deploys the plurality of deceptions among the plurality of assets within the IT environment based on the configuration of the plurality of assets in the IT environment (step 506). Thereafter, the process terminates.

Thus, illustrative embodiments of the present disclosure provide a computer-implemented method, computer system, and computer program product for deception management.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for deception management, the computer-implemented method comprising:
   detecting, by a deception management computer, configuration of a plurality of assets in an information technology (IT) environment of an entity based on an agent-less scan of the plurality of assets performed by the deception management computer;
   retrieving, by the deception management computer, threat intelligence regarding known cyberattacks and attack behavior corresponding to a geographic location of the IT environment from a cybersecurity system;
   generating, by the deception management computer, a plurality of customized deceptions by:
      customizing predefined deceptive entities and predefined network-based device emulations using a Web Assembly module integrated within the deception management computer;
      compiling each customized deception into a respective Web Assembly binary using Web Assembly System Interface (WASI) or WASI-NN for operating system deployment, wherein the Web Assembly binaries execute independently on target physical host endpoints without shared operating system vulnerabilities and without requiring individual virtual machines or containers;
      identifying, by the deception management computer, target physical host endpoints for deployment based on both the configuration of the plurality of assets and threat intelligence information corresponding to the geographic location; and
   deploying, by the deception management computer, the plurality of customized deceptions directly on the identified target physical host endpoints using the respective Web Assembly binaries without intermediary trap servers and without assigning IP addresses to the customized deceptions.

2. The computer-implemented method of claim 1, wherein the plurality of deceptions include at least one of a plurality of deceptive entities and a plurality of network-based device emulations.

3. The computer-implemented method of claim 1, further comprising:
   customizing, by the computer, a plurality of predefined deceptive entities and a plurality of predefined network-based device emulations by generating a deceptive entity Web Assembly binary for each respective deceptive entity of the plurality of predefined deceptive entities and a network-based device emulation Web Assembly binary for each respective network-based device emulation of the plurality of predefined network-based device emulations using a Web Assembly module to form a plurality of customized deceptive entities and a plurality of customized network-based device emulations; and
   deploying, by the computer, the plurality of customized deceptive entities and the plurality of customized network-based device emulations on a plurality of target physical host endpoints within the IT environment using the deceptive entity Web Assembly binary of each respective deceptive entity of the plurality of customized deceptive entities and the network-based device emulation Web Assembly binary of each respective network-based device emulation of the plurality of customized network-based device emulations.

4. The computer-implemented method of claim 1, further comprising:
   receiving, by the computer, an alert indicating access to one of a customized deceptive entity or a customized network-based device emulation deployed on a target physical host endpoint of a plurality of target physical host endpoints within the IT environment.

5. The computer-implemented method of claim 1, further comprising:
   sending, by the computer, a notification to a system administrator regarding an access to a customized deceptive entity or a customized network-based device emulation deployed on a target physical host endpoint in response to receiving an alert indicating the access; and
   performing, by the computer, a set of action steps automatically to mitigate effects of the access.

6. The computer-implemented method of claim 5, wherein the set of action steps includes automatically terminating a connection to the IT environment corresponding to the access, automatically removing any files, scripts, or code received during the access, sending a notification to a cybersecurity system regarding the access, and recording information corresponding to the access to prevent similar future access.

7. The computer-implemented method of claim 1, further comprising:
   receiving, by the computer, a download of a plurality of predefined deceptive entities and a plurality of predefined network-based device emulations into a Web Assembly module of the computer; and
   receiving, by the computer, an input to deploy the plurality of predefined deceptive entities and the plurality of predefined network-based device emulations within the IT environment of the entity.

8. The computer-implemented method of claim 1, further comprising:
   performing, by the computer, an asset discovery scan of the IT environment to detect a number of physical host endpoints in the IT environment, a location of each of the number of physical host endpoints within the IT environment, configuration of each of the number of physical host endpoints, and a type of operating system running on each of the number of physical host endpoints; and
   performing, by the computer, an analysis of the asset discovery scan of the IT environment.

9. The computer-implemented method of claim 1, further comprising:
   retrieving, by the computer, information regarding known cyberattacks and attack behavior corresponding to a geographic location of the IT environment from a cybersecurity system.

10. The computer-implemented method of claim 1, further comprising:
    identifying, by the computer, locations for placement of a plurality of predefined deceptive entities and a plurality of predefined network-based emulations on a plurality of target physical host endpoints within the IT environment based on an analysis of an asset discovery scan of the IT environment and known cyberattacks and attack behavior corresponding to a geographic location of the IT environment.

11. A computer system for deception management, the computer system comprising:
a communication fabric;
a set of computer-readable storage media connected to the communication fabric, wherein the set of computer-readable storage media collectively stores program instructions; and
a set of processors connected to the communication fabric, wherein the set of processors executes the program instructions to:
detect configuration of a plurality of assets in an information technology (IT) environment of an entity based on an agent-less scan of the plurality of assets;
retrieve threat intelligence regarding known cyberattacks and attack behavior corresponding to a geographic location of the IT environment from a cybersecurity system;
generate a plurality of customized deceptions by:
customizing predefined deceptive entities and predefined network-based device emulations using a Web Assembly module,
compiling each customized deception into a respective Web Assembly binary using Web Assembly System Interface (WASI) or WASI-NN for operating system deployment, wherein the Web Assembly binaries execute independently
target physical host endpoints without shared operating system vulnerabilities and without requiring individual virtual machines or containers;
identify target physical host endpoints for deployment based on both the configuration of the plurality of assets and a threat intelligence information corresponding to the geographic location; and
deploy the plurality of assets customized deceptions directly on the identified target physical host endpoints using the respective Web Assembly binaries without intermediary trap servers and without assigning IP addresses to the customized deceptions.

12. The computer system of claim 11, wherein the plurality of deceptions include at least one of a plurality of deceptive entities and a plurality of network-based device emulations.

13. The computer system of claim 11, wherein the set of processors further executes the program instructions to:
customize a plurality of predefined deceptive entities and a plurality of predefined network-based device emulations by generating a deceptive entity Web Assembly binary for each respective deceptive entity of the plurality of predefined deceptive entities and a network-based device emulation Web Assembly binary for each respective network-based device emulation of the plurality of predefined network-based device emulations using a Web Assembly module to form a plurality of customized deceptive entities and a plurality of customized network-based device emulations; and
deploy the plurality of customized deceptive entities and the plurality of customized network-based device emulations on a plurality of target physical host endpoints within the IT environment using the deceptive entity Web Assembly binary of each respective deceptive entity of the plurality of customized deceptive entities and the network-based device emulation Web Assembly binary of each respective network-based device emulation of the plurality of customized network-based device emulations.

14. The computer system of claim 11, wherein the set of processors further executes the program instructions to:
receive an alert indicating access to one of a customized deceptive entity or a customized network-based device emulation deployed on a target physical host endpoint of a plurality of target physical host endpoints within the IT environment.

15. A computer program product for deception management, the computer program product comprising a set of computer-readable storage media having program instructions collectively stored therein, the program instructions executable by a computer to cause the computer to:
detect configuration of a plurality of assets in an information technology (IT) environment of an entity based on an agent-less scan of the plurality of assets;
retrieve threat intelligence regarding known cyberattacks and attack behavior corresponding to a geographic location of the IT environment from a cybersecurity system;
generate a plurality of customized deceptions by:
customizing predefined deceptive entities and predefined network-based device emulations using a Web Assembly module integrated within the deception management computer,
compiling each customized deception into a respective Web Assembly binary using Web Assembly System Interface (WASI) or WASI-NN for operating system deployment, wherein the Web Assembly binaries execute independently
target physical host endpoints without shared operating system vulnerabilities and without requiring individual virtual machines or containers;
identify target physical host endpoints for deployment based on both the configuration of the plurality of assets and a threat intelligence information corresponding to the geographic location; and
deploy the plurality of assets customized deceptions directly on the identified target physical host endpoints using the respective Web Assembly binaries without intermediary trap servers and without assigning IP addresses to the customized deceptions.

16. The computer program product of claim 15, wherein the plurality of deceptions include at least one of a plurality of deceptive entities and a plurality of network-based device emulations.

17. The computer program product of claim 15, wherein the program instructions further cause the computer to:
customize a plurality of predefined deceptive entities and a plurality of predefined network-based device emulations by generating a deceptive entity Web Assembly binary for each respective deceptive entity of the plurality of predefined deceptive entities and a network-based device emulation Web Assembly binary for each respective network-based device emulation of the plurality of predefined network-based device emulations using a Web Assembly module to form a plurality of customized deceptive entities and a plurality of customized network-based device emulations; and
deploy the plurality of customized deceptive entities and the plurality of customized network-based device emulations on a plurality of target physical host endpoints within the IT environment using the deceptive entity Web Assembly binary of each respective deceptive entity of the plurality of customized deceptive entities and the network-based device emulation Web Assembly binary of each respective network-based device emulation of the plurality of customized network-based device emulations.

18. The computer program product of claim 15, wherein the program instructions further cause the computer to:
receive an alert indicating access to one of a customized deceptive entity or a customized network-based device emulation deployed on a target physical host endpoint of a plurality of target physical host endpoints within the IT environment.

19. The computer program product of claim 15, wherein the program instructions further cause the computer to:
send a notification to a system administrator regarding an access to a customized deceptive entity or a customized network-based device emulation deployed on a target physical host endpoint in response to receiving an alert indicating the access; and
perform a set of action steps automatically to mitigate effects of the access.

20. The computer program product of claim 19, wherein the set of action steps includes automatically terminating a connection to the IT environment corresponding to the access, automatically removing any files, scripts, or code received during the access, sending a notification to a cybersecurity system regarding the access, and recording information corresponding to the access to prevent similar future access.

\* \* \* \* \*